United States Patent Office 2,936,804
Patented May 17, 1960

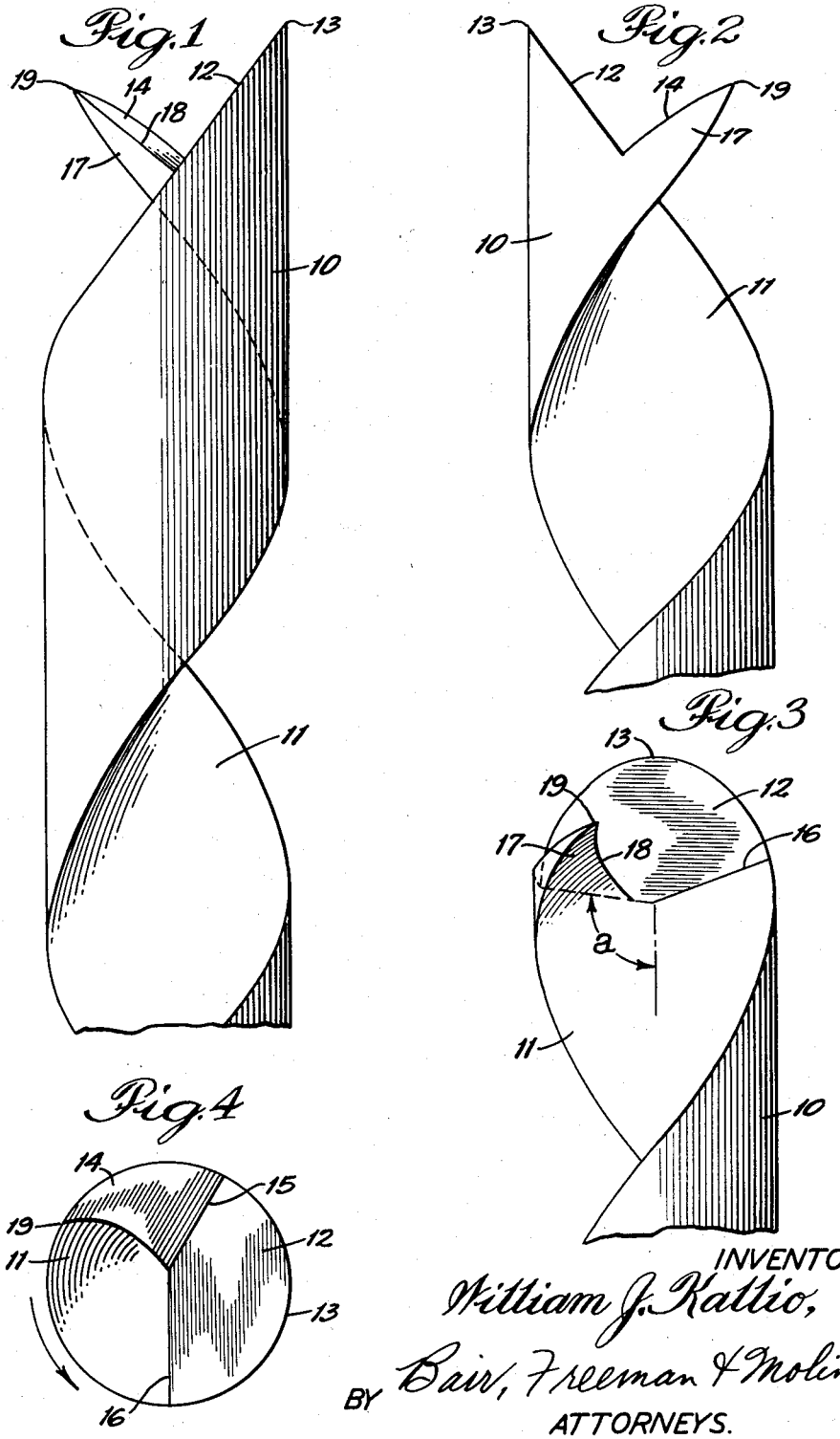

2,936,804
TWIST DRILL

William J. Kallio, Glen Ellyn, Ill., assignor to United-Greenfield Corporation, Chicago, Ill., a corporation of Delaware Application June 16, 1958, Serial No. 742,354

1 Claim. (Cl. 145—117)

This invention relates to twist drills and more particularly to a drill for drilling relatively soft fibrous materials such as molded fibrous ceiling or wall tiles.

In the manufacture of fibrous acoustical tiles of the type formed with a plurality of cylindrical openings therein, it has been necessary to drill the openings in order to obtain smooth cylindrical walls of uniform diameter in the bores and which terminate in relatively sharp lips at the surface of the material. Drilling of relatively soft fibrous materials of this type presents a very difficult problem and cannot be successfully accomplished by the use of conventional drills. With conventional drills, the fibers tend to be compressed and will spring back after drilling to leave uneven or irregular surfaces in the holes. Such drills also tend to tear or pull the fibers to leave holes with rough or fuzzy walls. This is not only unsightly but interferes with the desired sound absorption properties of acoustical tiles.

It is one of the objects of the present invention to provide a twist drill which will cut a smooth cylindrical hole in soft fibrous material without compressing, tearing, or pulling the fibers.

Another object of this invention is to provide a drill in which the material is first cut in a circular line by a cutting spur at the end of the drill and the material inside of the cut line is then removed by a relatively small cutting lip.

A further object is to provide a drill in which the surfaces at the cutting tip blend smoothly into each other to leave no sharply angular meeting surfaces which would define traps or pockets to collect fibers or particles which might interfere with proper operation of the drill.

A still further object is to provide a drill which is extremely easy to form and to resharpen.

Accordingly, it is a feature of the invention that the cutting point of the drill is formed by two flat intersecting surfaces which can be ground by a single pass across a grinding wheel.

The above and other objects and features of the invention will be more readily apparent from the following description when read in connection with the accompanying drawing in which:

Figure 1 is a side elevation of a drill embodying the invention looking from the right in Figure 4;

Figure 2 is a similar elevation looking from the left in Figure 4;

Figure 3 is a similar view looking from the bottom in Figure 4; and

Figure 4 is an end view of the drill.

The drill as shown comprises a cylindrical body indicated generally at 10 which is formed with a single relatively large helical chip flute 11. The body may be formed by twisting a relatively flat strip and thereafter grinding it to form an accurate cylindrical surface on the body or if preferred may be formed by grinding the chip flute in a cylindrical rod. The exact shape and depth of the chip flute are not critical, but preferably the chip flute has a radial depth equal to approximately one-half of the diameter of the drill body. The angle of the chip flute may also be varied within relatively wide limits as desired but is preferably on the order of about forty-five degrees as shown.

At the cutting tip of the body a flat surface 12 is ground thereon which extends diametrically across the end of the body and which lies at approximately the same angle as the trailing edge of the chip flute and blends smoothly into the trailing edge of the chip flute as best seen in Figure 1. The flat surface 12 intersects the outer cylindrical surface of the body to form therewith a curved sharp edged spur terminating in an outer cutting edge 13 which constitutes the outermost point on the cutting tip.

A second substantially flat surface 14 is ground on the cutting tip and lies at an angle to the surface 12 as shown. The angle in the drill illustrated is approximately ninety degrees or slightly in excess of ninety degrees and will vary in accordance with variations in the angle of the chip flute so that the surface 14 slopes outwardly toward the cutting tip of the drill from its line of intersection with the surface 12.

The surfaces 12 and 14 intersect along a generally straight line as indicated by the dotted line 15 in Figure 3 and which may be a relatively sharp angle or which may have a rounded fillet as desired. As best seen in Figure 3, the line of intersection 15 slopes downwardly from the outer surface of the drill body toward its axis at an angle $a$ with the drill axis which is slightly in excess of a right angle. With the line sloping in this manner, it will blend smoothly into the surface of the chip flute so that there are no traps or pockets formed at this point in which loose fibers or other particles might tend to collect. It will be noted also that the flat surface 12 blends smoothly into the surface of the chip flute along a line 16 to avoid any sharp angles in which particles might tend to collect.

The surface 14 intersects the surface of the chip flute and the outer cylindrical surface of the drill body at the leading edge of the spur formed by the surface 12 to define a relatively small lip 17. The lip as shown will terminate in an edge 18 at its point of intersection with the surface of the chip flute and terminates in a sharp point 19. The angle of the surface 14 is so selected that the point 19 will project axially beyond any other point on the surface 14 so that the point will first engage the material and loosen it to be picked up by the chip flute without any possibility of compressing the material.

In use, as the drill is advanced into the material to be cut, the cutting edge of the spur 13 will first engage the material and will cut a circular line therein. It will be noted that the cutting edge 13 projects axially substantially beyond the point 19 of the lip 17 so that the material will be cut to an appreciable depth in a circular line before it is engaged by the lip 17. As the drill continues to advance into the material, the point 19 of the lip 17 will engage the cut material within the circular line and will lift it without compressing it. The material picked up by the point of the lip will be carried smoothly into the chip flute in a relatively loose condition and will be carried away by the chip flute. With the construction as shown in which the point 19 projects beyond any other portion of the surface 14, the material loosened by the tip will be carried into the flute before it can be engaged and compressed by the surface 14. In this way a very clean, uniform hole can be drilled in relatively loose material without compressing the material and without tearing or pulling the fibers since the cutting action is performed by the sharp edge of the spur 13 before the material is engaged by any other surfaces.

It will be seen that the drill of the present invention can be manufactured very simply and can easily be resharpened. In order to make the drill, it is necessary only to take a drill body having the desired spiral chip flute therein and make a single cut therein by a grinding wheel having two grinding surfaces meeting at an angle simultaneously to form the two flat surfaces 12 and 14. For re-grinding, a single pass across a wheel can be made to re-grind the surfaces 12 and 14 with the surface 12 lying at the same angle as the trailing edge of the chip flute and blending into the trailing edge of the chip flute. The drill body can be made of any desired length and can be used by resharpening throughout its full length so that maximum drill life is achieved.

While one embodiment of the invention has been shown and described in detail, it will be understood that this is illustrative only and is not to be taken as a definition of the scope of the invention, reference being had for this purpose to the appended claim.

What is claimed is:

A twist drill comprising a cylindrical body formed with a helical chip flute extending to the cutting tip thereof, the cutting tip of the body being formed with a substantially flat surface extending across the end of the body and substantially parallel to and blending into the trailing edge of the chip flute, said surface intersecting the cylindrical outer surface of the body at one side and defining therewith an axially extending cutting spur at one side of the body, and a second substantially flat surface intersecting the first named surface at an angle thereto, the line of intersection of said surfaces blending into the surface of the chip flute adjacent to the axis of the drill and extending radially to the surface of the body at an angle slightly greater than 90° to the axis of the body, the second surface defining with the outer surface of the body and the chip flute surface a digging lip lying wholly at one side of the axis of the body and extending axially toward the tip of the drill and terminating short of the outer edge of the spur measured axially of the body.

References Cited in the file of this patent

UNITED STATES PATENTS

| 2,675,841 | Einhiple | Apr. 20, 1954 |
| 2,792,862 | Emmons | May 21, 1957 |

FOREIGN PATENTS

| 634,350 | Great Britain | Mar. 15, 1950 |